April 21, 1925. 1,534,691
S. R. DARBY
SPEED GOVERNOR FOR TRACTORS
Filed Nov. 1, 1922
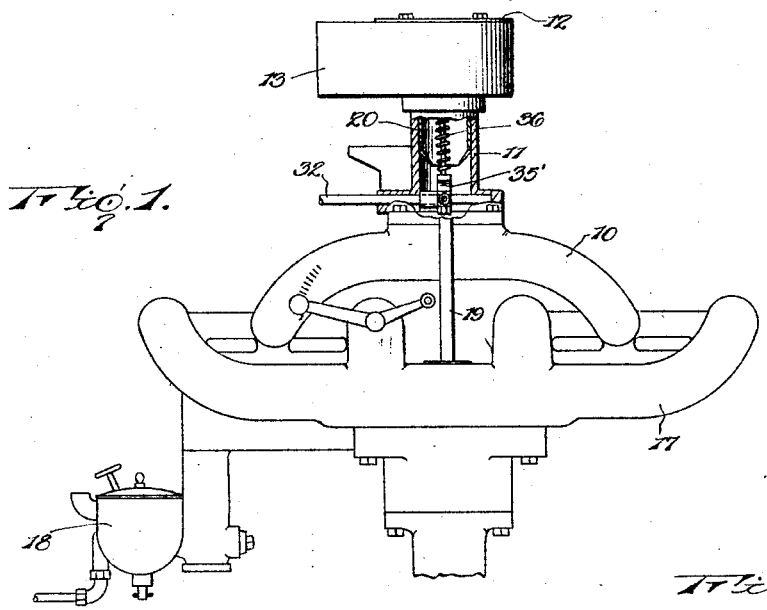
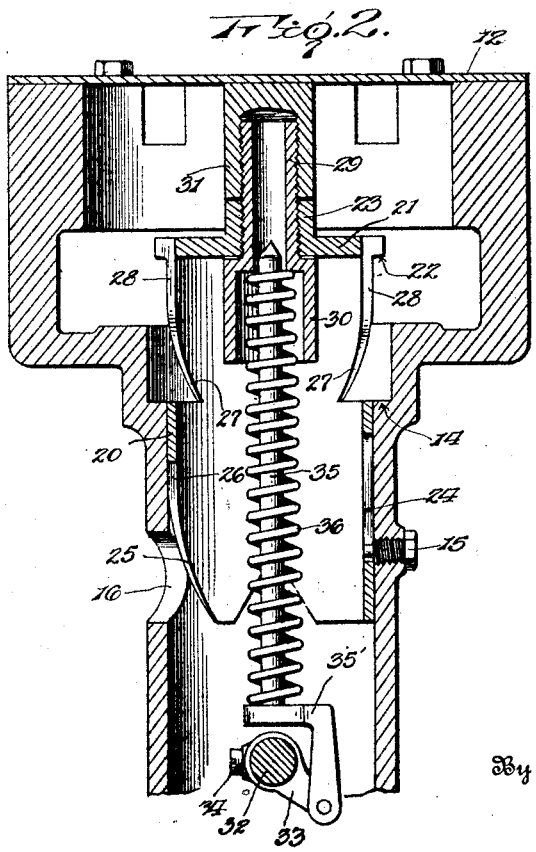
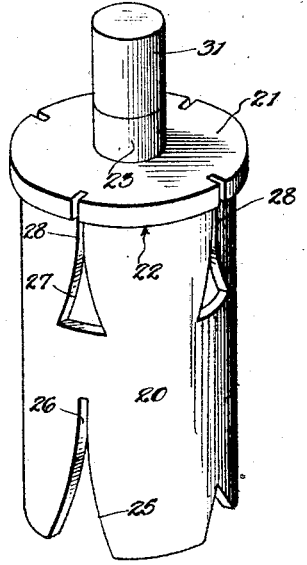
Inventor
S. R. Darby.
By Lacy & Lacy, Attorneys Patented Apr. 21, 1925.

1,534,691

UNITED STATES PATENT OFFICE.

SCOTT R. DARBY, OF MEDFORD, OREGON.

SPEED GOVERNOR FOR TRACTORS.

Application filed November 1, 1922. Serial No. 598,453.

*To all whom it may concern:*

Be it known that I, SCOTT R. DARBY, citizen of the United States, residing at Medford, in the county of Jackson and State of Oregon, have invented certain new and useful Improvements in Speed Governors for Tractors, of which the following is a specification.

This invention relates to an improved speed governor for Fordson tractors, being similar to the governor shown in my pending application filed April 18, 1922, Serial No. 555,039, and seeks, as one of its principal objects, to provide a suction operated governor which will automatically function to regulate the flow of fuel mixture to the tractor engine.

A further object of the invention is to provide a governor embodying a suction operated fuel mixture controlling valve and wherein the normal position of the valve may be readily adjusted for regulating the speed of the engine.

Another object of the invention is to provide a governor embodying a spring to resist closing of the valve and wherein the tension of said spring may be manually regulated for accelerating or retarding the speed of the engine.

And the invention has as a still further object to provide a valve which may be installed with a minimum of difficulty.

Other and incidental objects will appear hereinafter.

In the drawings:

Figure 1 is a fragmentary elevation showing my improved governor in connection with the intake manifold and associated structure of a Fordson tractor, parts being shown in section, Figure 2 is an enlarged sectional view showing the valve of the governor open, and Figure 3 is a perspective view showing the valve in detail.

As previously intimated, the present governor is more particularly designed for use in connection with Fordson tractors and, in the drawings, I have accordingly shown the device in conjunction with the intake manifold and associated parts of such a tractor. The intake manifold is indicated at 10 and connected to the manifold is a mixing chamber including an inlet pipe 11 bolted to the manifold, the chamber being closed at its upper end by a cover plate 12 and being formed with an air intake 13 entering the upper end portion of the chamber. As brought out in Figure 2, the pipe 11 is counterbored at its upper end to define an internal annular shoulder 14 and threaded through the wall of the pipe is a screw 15 which, under ordinary circumstances, serves to retain a choke tube within the pipe. Opposite the screw 15, the pipe is formed with a fuel port 16. The exhaust manifold of the tractor engine is indicated at 17 while the carbureter is indicated at 18 and leading from the carbureter to the port 16 through the exhaust manifold is a fuel mixture pipe 19. All of this structure is, of course, conventional and need not, therefore, be described in further detail.

In carrying the invention into effect, I employ a cylindrical valve 20 open at its lower end and closed at its upper end by a head 21 overhanging the wall of the valve to define an annular shoulder 22 at the upper extremity of the valve. Rising from said head axially of the valve is a nipple 23. As particularly brought out in Figure 2, the valve is formed to snugly but slidably fit within the inlet pipe 11 of the manifold 10 of the tractor engine and is provided at one side with a longitudinally directed slot 24 accommodating the inner end of the screw 15 so that the screw thus serves to slidably connect the valve with said pipe. As is well known, the mixing chamber normally houses an air valve, valve guide, and choke tube, and in installing the valve of the present invention, these parts are, of course, first removed.

At its lower end, the valve 20 is notched to define a fuel mixture inlet port 25 gradually tapered toward its upper end to define a vertical slot or passage 26 at the upper end of the port. The port 25 is disposed to register with the port 16 of the inlet pipe 11 and formed in the valve near its upper end is a plurality of circumferentially spaced air inlet ports 27. These ports, like the port 25, are also preferably triangular and are gradually tapered toward their upper ends to define vertical slots or passages 28 at the upper ends of the ports 27 opening through the head 21 of the valve. Threaded through the nipple 23 of the valve head is a tubular adjusting screw 29 formed at its inner end with a cylindrical socket or cup 30 and threaded upon the outer end of said screw is a locking cap 31. The usual throttle rod of the tractor engine is indicated at 32. As shown in Figure 1, this rod is journaled through the pipe 11 near its lower end and in connection with the rod I employ an arm 33 secured to the rod by a set screw 34. Slidably fitting at its upper end in the adjusting screw 29 is a guide rod 35 equipped at its lower end with a foot 35' offset with respect to the rod for a distance substantially equal to the length of the arm 33 and pivotally connected thereto normally supporting the guide rod in a plane with the throttle rod 32. Surrounding said rod is a spring 36, one end of which bears within the cup 30 of said screw while the other end of the spring engages the foot 35'. In thus employing the foot 35', the travel of the arm 33 will not be sufficient to cause the guide rod to bind at its upper end within the screw 29.

In operation, air is drawn in by engine suction through the intake 13 into the mixing chamber while fuel mixture is drawn through the port 16 to be mingled with the air in said chamber. Accordingly, when the engine is started, engine suction will tend to draw the valve 20 downwardly against the tension of the spring 26 so that the valve will be moved to cover the port 16 as well as also cover the air inlet ports 27. The valve will, therefore, function to gradually cut off the supply of fuel mixture to the engine as the speed of the engine increases while when the speed of the engine decreases, the valve will return to its normal position to permit a correspondingly increased flow of fuel mixture to the engine cylinders so that the speed of the engine will be maintained relatively constant. By rotating the throttle rod 32 in one direction, the arm 33 may be swung to decrease the effective distance between the arm and the adjusting screw 29 of the valve and accordingly increase the tension of the spring 36 for resisting closing movement of the valve with correspondingly increased pressure. On the other hand, by rotating the throttle rod 32 in the opposite direction, the tension upon the spring may be decreased so that, as will be seen, the speed of the engine may be readily controlled through manipulation of the throttle rod. The screw 29 is provided for adjustably setting the minimum tension upon the spring 36 to, in turn, regulate the normal speed of the engine. By removing the cap 31 the said screw may, as will be appreciated, be readily adjusted to either increase or decrease the mean tension of the spring to, in turn, regulate the action of the valve and thereby vary the speed of the engine for any given position of the throttle rod. Normally, the cap 31 will, of course, cooperate with the nipple 23 of the valve head for locking the regulating screw in adjusted position and, in this connection, it will be noted that said cap will engage the cover plate 12 of the mixing chamber for limiting the valve in its upward movement. On the other hand, when the valve is shifted downwardly, the shoulder 22 of the valve will engage the shoulder 14 in the pipe 11 for limiting the valve in its downward movement when flow through the ports 25 and 27 of the valve will be cut off. However, the passage 26 of the valve will, when the valve is thus shifted downwardly, be moved across the port 16 of the pipe 11 to permit a restricted flow of fuel mixture into said pipe while the passages 28 of the valve will remain open to permit restricted flow of air through the valve. Accordingly, even though the valve is shifted to the limit of its downward movement, the tractor engine will not be stopped but will be permitted to continue in operation at a retarded speed.

Having thus described the invention, what is claimed as new is:

1. The combination with an engine fuel mixing chamber having air and fuel mixture inlets, of a suction operated valve slidably mounted in said chamber and movable to restrict flow through said inlets, a rotatable throttle rod having an arm thereon, a tubular regulating screw adjustable upon the valve, a rod connected to said arm and slidably received in said screw, and a spring surrounding said rod bearing between the screw and said arm whereby the rod may be rotated for varying the tension of said spring to resist closing movement of the valve.

2. A speed governor including a suction operated valve formed to slidably fit in the usual intake passage of an engine and provided with air and fuel ports, a screw carried by the valve and provided at its inner end with a cup, a spring for resisting closing movement of the valve and having one end thereof accommodated in said cup, the screw being adjustable for varying the tension of said spring, and means adjustable upon the screw for varying the position of the valve when open.

3. The combination with an engine intake conduit, of a hollow suction operated valve slidably fitting in said conduit and provided with a port in the wall thereof, the valve being open at one end, a rod extending into the valve at its open end and slidably associated with the valve, a spring surrounding said rod resisting movement of the valve to close said port, and means carried by the valve slidably receiving said rod and adjustable for regulating the mean tension of said spring.

4. The combination with an engine intake conduit, of a hollow suction operated valve slidably fitting in said conduit and provided with a port in the wall thereof, the valve being open at one end, a rod extending into the valve at its open end and slidably associated with the valve, a spring surrounding said rod resisting movement of the valve to close said port, and an adjusting screw carried by the valve slidably receiving said rod and providing an abutment for said spring, the screw being adjustable for regulating the mean tension of the spring.

5. The combination with an engine intake conduit, of a hollow suction operated valve slidably fitting in said conduit and provided with a port in the wall thereof, the valve being open at one end, a rod extending into the valve at its open end and slidably associated with the valve, a spring surrounding said rod resisting movement of the valve to close said port, means carried by the valve slidably receiving said rod and adjustable for regulating the mean tension of said spring, and locking means for said regulating means limiting the valve in its movement to open position.

6. The combination with an engine intake conduit, of a hollow suction operated valve slidably fitting in said conduit and provided with a port in the wall thereof, the valve being open at one end, a rod extending into the valve at its open end and slidably associated with the valve, a spring surrounding said rod resisting movement of the valve to close said port, an adjusting screw carried by the valve slidably receiving said rod and providing an abutment for said spring, the screw being adjustable for regulating the mean tension of the spring, and an element engaged with said screw to coact with the valve locking the screw in adjusted position and limiting the valve in its movement to open position.

7. The combination with a chamber having a fuel mixture conduit leading therefrom, and a removable plate closing the chamber, of a hollow suction operated valve slidably fitting in said conduit and provided with a port in the wall thereof, the valve being open at one end, a rod extending into the valve at its open end and slidably associated therewith, a spring surrounding said rod resisting movement of the valve to close said port, means carried by the valve slidably receiving said rod and adjustable for regulating the mean tension of said spring, and locking means for said regulating means disposed to abut said plate for limiting the valve in its movement to open position.

8. A speed governor including a hollow valve open at one end and provided with a port in the wall thereof, the valve being provided at its opposite end with an end wall, a tubular adjusting screw carried by said end wall, a rod extending into the valve at its open end and slidably received in said screw, a spring carried by the rod to abut said screw, throttling means for shifting said rod relative to the valve and varying the tension of said spring, the screw being adjustable upon the valve for regulating the mean tension of the spring, and locking means for the screw carried thereby.

In testimony whereof I affix my signature.

SCOTT R. DARBY. [L. S.]